UNITED STATES PATENT OFFICE.

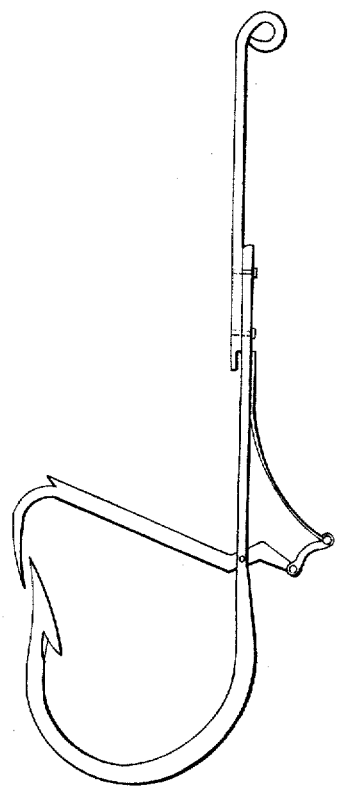
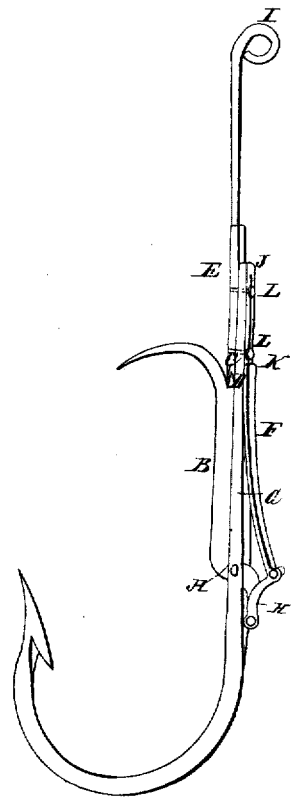

ENGELBRECHT AND SKIFF, OF NEW YORK, N. Y.

IMPROVEMENT IN FISH-HOOKS.

Specification forming part of Letters Patent No. 4,670, dated July 28, 1846.

*To all whom it may concern:*

Be it known that we, THEODORE F. ENGELBRECHT and GEORGE F. SKIFF, of the city of New York, in the State of New York, have invented a new and Improved Mode of Constructing Hooks for Catching Fish; and we do hereby declare that the following is a full and exact description of the same, and to enable others skilled in the arts to make and use our invention, we proceed to describe its construction and operation.

We take a hook made like an ordinary fish-hook, of any suitable metal or other material, and at a proper distance up the shank, about where the curve of the hook terminates, the shank is flattened to the end thereof. At the point A, Figure 1, is attached a lever, B, being so curved that when its point is depressed it slightly overlaps the point of the hook. This lever is held up by the projection C, attached to the slide E, dropping down over the catch or spur D on the aforesaid lever. F is a spring fastened to the shank of the hook G, and so jointed to the tumbler H as to be thrown down with considerable force the moment the connection at C and D is disengaged—a result which brings the point of the hook and the curved point of the lever into close contact, (see Fig. 2,) and the fish is thus firmly held fast without any power to escape by slipping off the hook. The line is attached to the slide E at the shank I. The spring F being set and the bait adjusted, the hook is ready for being lowered into the water. When the bait is taken into the fish's mouth the least pull causes the hook G to descend by means of the slide E. This descent disengages the lever from the connection at C and D, and the fish is caught on his head by the descending lever B. The slide E operates by means of one or two rivets passing from it through a slot, which extends from the front to the back of the shank G, and in which the rivets play from J to K. The rivets are shown by the dotted lines between J and K, and their heads L L confine the slide to its proper place. This slide may be made to operate by means of a ring or band round the shank, and the shank may be flattened, as before stated, or it may be made round. The form we do not consider of any importance, as a round or flattened shank will be adopted according to its economy in manufacturing.

The lever may be made with one or more curved points, and to act in any suitable manner to secure the fish by substituting a spiral spring for that now used; but we consider the flat spring preferable.

What we claim as our invention, and desire to secure by Letters Patent, is—

1. The construction of a self-acting spring and slide lever-hook for catching fish, constructed as above described, and whether spiral or other springs are employed, or whether the lever is made to descend by being disengaged from a slide operating as herein described, or by any other analogous process.

2. The invention of a hook for catching fish, operated by a spring, a lever, and a slide, whether working as described above or in any other way.

THEODORE F. ENGELBRECHT.
GEORGE F. SKIFF.

In presence of—
C. D. RIGNEY,
S. B. HOLT.